No. 678,093. Patented July 9, 1901.
F. E. BOCORSELSKI.
UNIVERSAL JOINT.
(Application filed Mar. 23, 1901.)

(No Model.)

Witnesses
C. F. Kilgore
F. M. Bragg

Inventor
Frank E. Bocorselski
By Simonds & Hart
Attorneys

THE NORRIS PETERS CO., PHOTO-LITHO., WASHINGTON, D. C.

UNITED STATES PATENT OFFICE.

FRANK E. BOCORSELSKI, OF SPRINGFIELD, MASSACHUSETTS.

UNIVERSAL JOINT.

SPECIFICATION forming part of Letters Patent No. 678,093, dated July 9, 1901.

Application filed March 23, 1901. Serial No. 52,527. (No model.)

*To all whom it may concern:*

Be it known that I, FRANK E. BOCORSELSKI, a citizen of the United States of America, residing at Springfield, in the county of Hampden and State of Massachusetts, have invented a certain new and useful Improvement in Universal Joints, of which the following is a specification, reference being had to the accompanying drawings, wherein—

Figure 1:
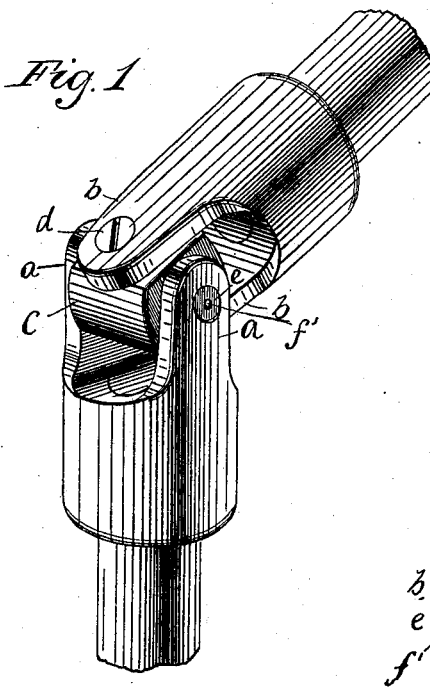
Figure 6:
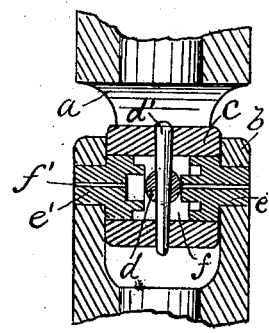
Figure 2:
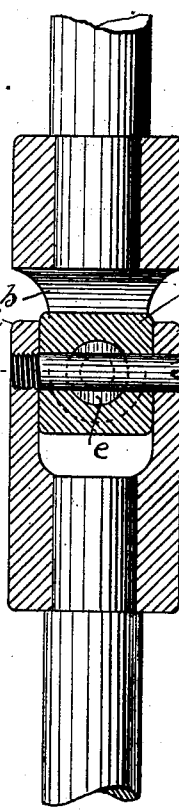
Figure 3:
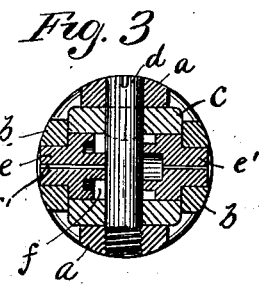
Figure 5:
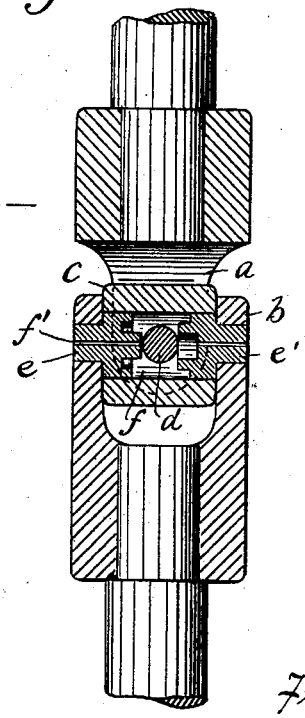
Figure 4:
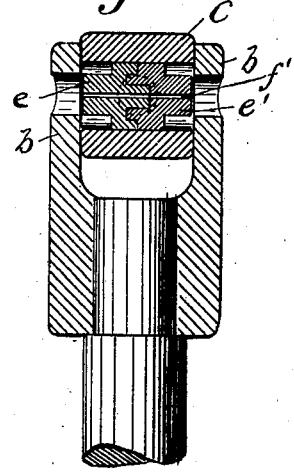

Figure 1 is a view of a universal joint embodying said improvement. Fig. 2 is a view of the same joint largely in central vertical section. Fig. 3 is a view of the same joint which is shown in Fig. 2 in cross-section on the plane denoted by the dotted line $x\ x$. Fig. 4 is a view of one shaft and its bifurcations—a view in longitudinal section on the plane at right angles to that of Fig. 2. It is a view of parts only partially assembled, having for its object to show how the block and the partial pivot-shafts are gotten into place. Fig. 5 is a view of the complete joint, largely in central longitudinal section, on a plane at right angles to that of Fig. 2. Fig. 6 is a view of a modification—a view similar to Fig. 5.

The object of the improvement is the production of what is generally called a "universal joint," having features of novelty and advantage whereby one rotary shaft drives another which is not in the same alinement. The two shafts are bifurcated at the ends which are connected by the joints.

In the accompanying drawings, Figs. 1 to 5, inclusive, the letter $a$ denotes the bifurcations of one shaft, and the letter $b$ denotes the bifurcations of the other shaft.

The letter $c$ denotes what may be termed an "intermediate block," which may well be exteriorly of the shape which is shown in the drawings; but that shape is not essential, for within reasonable limits it may be varied at pleasure. This intermediate block is pierced by shaft-bearings, which are at right angles to each other for the admission and passage of the pivot-shafts soon to be described.

The letter $d$ denotes a pivot-shaft by which the intermediate block is pivotally attached to the bifurcations $a$. In the construction which is shown in the drawings one screw-threaded end of this shaft takes into a corresponding interior screw in one of the forks $a$, and the other end is cross-slotted for actuation by a screw-driver or the like.

The letters $e$ and $e'$ denote two partial pivot-shafts by which the block $c$ is pivotally attached to the bifurcations $b$. When the assembling of the parts is complete, these partial pivot-shafts are kept apart and in their proper places by the shaft $d$, which passes between them. In order to effect that assembling, the two partial pivot-shafts $e$ and $e'$ are placed within the block, as shown in Fig. 4. Then by separating them and putting the shaft $d$ in place they are kept in the position shown in Figs. 3 and 5. In doing this pressure may first be applied endwise to one of the partial pivot-shafts, so as to force the other into its place. When the shaft $d$ is fastened in place, all the parts are properly locked together. When the parts are assembled, there is an open space between the inner ends of the two partial pivot-shafts, which serves as an oil-well $f$, and oil may have admission thereto through an oil-duct $f'$, of which there may be one in each of the partial pivot-shafts. The whole device is one of great simplicity and great strength, having ample and sufficient means for receiving and retaining the oil used for lubrication. It is a mechanism that is readily assembled and readily taken apart. The principal parts of the device are contained within the inclosure of the two sets of bifurcations and the whole comes within a certain circumferential diameter.

In Fig. 6 is shown a modification. Here the pivot-shaft $d$ is not screw-threaded, but is secured in place by the pin $d'$, which can be put in and taken out by setting parts $a$ and $b$ at right angles to each other.

I claim as my improvement—

1. In combination, the two bifurcated shafts, the intermediate block pierced by shaft-bearings at right angles to each other, the partial pivot-shafts, and the pivot-shaft arranged between the two partial pivot-shafts, all substantially as described and for the purposes set forth.

2. In combination, the two bifurcated shafts, the intermediate block pierced by shaft-bearings, the pivot-shaft, and the partial pivot-shafts pierced, one or both, by an oil-duct, all substantially as described and for the purposes set forth.

FRANK E. BOCORSELSKI.

Witnesses:
F. M. BRAGG,
C. F. KILGORE.